May 21, 1963 A. LIBERMAN 3,090,834
INPUT CIRCUIT FOR INTERCOMMUNICATION SYSTEM
Original Filed May 31, 1955
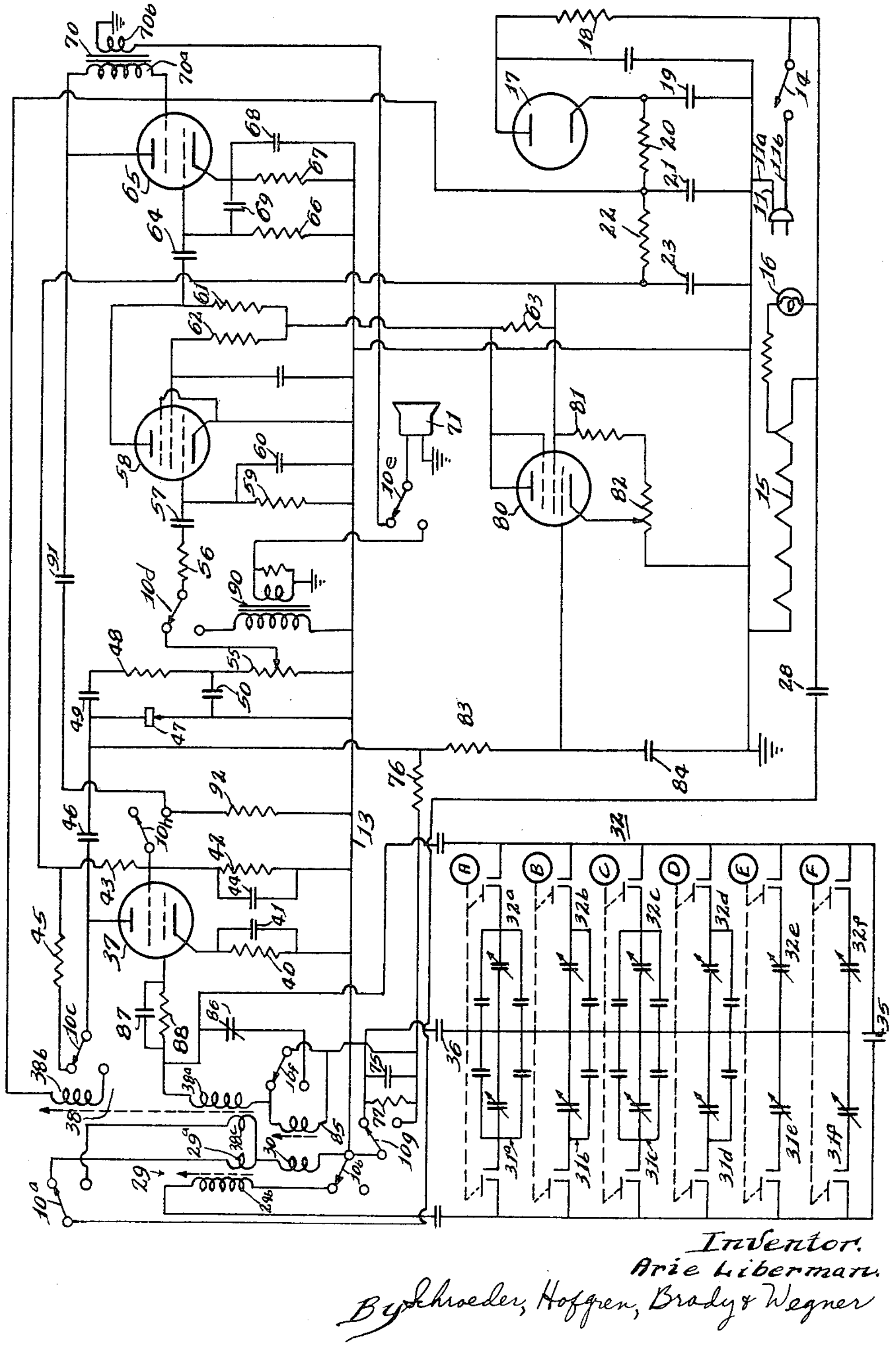
Inventor:
Arie Liberman
By Schroeder, Hofgren, Brady & Wegner
Attorneys.

United States Patent Office 3,090,834

Patented May 21, 1963

3,090,834

INPUT CIRCUIT FOR INTERCOMMUNICATION SYSTEM

Arie Liberman, % Talk-A-Phone, 1512 S. Pulaski Road, Chicago, Ill.

Original application May 31, 1955, Ser. No. 512,206, now Patent No. 2,980,767, dated Apr. 18, 1961. Divided and this application Oct. 23, 1956, Ser. No. 617,713

6 Claims. (Cl. 179—2.5)

This invention is concerned with a carrier wave intercommunication system which utilizes power lines for transmitting a modulated carrier wave between stations, and more particularly with an input circuit for such a system. This application is a division of my copending application Serial No. 512,206, filed May 31, 1955, now Patent 2,980,767, issued April 18, 1961.

It is a principal object of this invention to provide a new and improved intercommunication station, particularly adapted for use in multi-channel systems.

One feature of the invention is the provision of an arrangement for coupling a station to the power line, comprising a tuned coupling circuit for the station, an impedance and means for connecting the coupling circuit and the impedance across the line, whereby the effect on the tuned circuit of reactive loads added to the line is minimized. Another feature is that the station has a tuned line coupling transformer and a radio frequency choke is connected in series with a winding of the transformer, across the line, whereby the effect on the tuning of said transformer of reactive loads connected to the line is minimized.

Further features and advantages will readily be apparent from the following specification and from the drawing which is a schematic representation of the circuit.

The present system is particularly designed for multi-channel use as contrasted with single channel systems, such as that shown in my copending application, Serial No. 430,956, filed May 19, 1954, now Patent 2,887,533, issued May 19, 1959. The general principles of operation of the present system are quite similar to those of the two station system shown in the copending application and reference may be had thereto for details of the external physical appearance of the station units and of the interconnection and operation thereof. Preliminarily, one of the biggest differences between the two systems is the provision in a multi-channel system, of a plurality of selectable circuit components for tuning each station to one of a group of different frequencies.

While one specific circuit is shown in the drawing and values will be given herein for the components thereof, it is to be understood that this circuit is intended to be representative only and many modifications will be readily apparent to those skilled in the art.

The circuit which will be described is that of a "master" station which can originate calls to and answer calls from any other station, as contrasted with a "staff" station which can only answer calls, or originate calls to other stations on its frequency. In the embodiment shown the station is provided with six sets of circuit components by virtue of which it may operate on any one of six different frequencies, the operating frequency being selected through manipulation of selector switches A, B, C, D, E and F. In contrast, a staff station for use in the same system operates on a single, fixed frequency. Many of the components of the circuit serve a dual function, operating in one manner during transmission and in another manner during reception and the interconnection of the various circuit elements, and thus the manner in which they operate, is determined by the position of an eight-pole double-throw switch 10, which will hereinafter sometimes be referred to as the "talk-listen" switch. This switch is shown in the listen position in the drawing and in practice, is generally spring biased to this position.

Turning now more specifically to the drawing, it will be seen that power cord 11 is provided with a male connector 12 which may be inserted into a suitable electrical outlet of a 110 volt A.C. or D.C. power system. The power line (not shown) then serves not only to supply power to the unit, but also to carry the modulated signals between the various units of the system. Conductor 11*a* of the power cord is connected to a common or ground line 13. Conductor 11*b* is broken by "On-Off" switch 14.

When switch 14 is closed, the series connected filaments 15 of the various tubes in the unit are connected across the power line as is an indicator light 16 which is lighted when the power is on. The power supply section of the unit comprises a single, half-wave rectifier 17, a 35W4, the anode of which is connected through resistor 18, 47 ohms, to one side 11*b* of the power line. A capacity input filter comprising capacitor 19, 40 $\mu$f. (microfarads), resistor 20, 220 ohms, capacitor 21, 20 $\mu$f., resistor 22, 2200 ohms and capacitor 23, 8 $\mu$f., is connected between the cathode of rectifier 17 and the common line 13. The power supply has an output voltage of 80–95 volts depending on the current drawn. A high B+ of 100 volts is available across capacitor 21.

The signal input circuit for the unit is also connected, through blocking capacitor 28, .1 $\mu$f., and section 10*a* of the talk-listen switch, across the power line. The input circuit includes primary winding 29*a* of antenna transformer 29 connected in series with a radio frequency choke 30. Antenna transformer secondary coil 29*b* is connected through section 10*b* of the talk-listen switch to ground and is tuned to resonance at the desired frequency by one of the variable capacitor sections 31*a*, 31*b*, 31*c*, 31*d*, 31*e* or 31*f* depending on which of the station selector switches A, B, C, D, E and F is chosen, it being necessary that one of the selector switches be actuated for the unit to operate.

The antenna transformer has a primary winding of 80 turns of 7 strand No. 40 Litz wire with an inductance of 175 $\mu$h. (microhenry) and a secondary winding of 335 turns of 7 strand No. 40 Litz wire, 2.8 mh. The values of the various capacitors depend on the frequencies used, which in the particular unit being described are as follows:

| Channel | Frequency (kc.) | Capacity 31 or 32 ($\mu\mu$f.) |
|---|---|---|
| A | 98 | 1,300–1,350 |
| B | 116 | 800– 850 |
| C | 139 | 500– 550 |
| D | 161 | 400– 450 |
| E | 212 | 300– 350 |
| F | 250 | 300– 350 |

The incoming signal is coupled through a circuit, including capacitors 35, 1.2 $\mu\mu$f. (micromicrofarads), and 36, 0.27 $\mu$f., and which will be described more fully later, to the tuned grid circuit of the radio frequency amplifier stage 37, a 50C5. The tuned grid circuit includes winding 38*a* (a part of oscillator transformer 38) and the selected one of the variable capacitors 32*a*, 32*b*, 32*c*, 32*d*, 32*e* and 32*f*. The cathode of radio frequency amplifier 37 is returned to the common connection or ground 13 through a bias network including resistor 40, 330 ohms and capacitor 41, .1 $\mu$f. The screen grid of the amplifier is connected at the junction point of two 47,000 ohm resistors 42 and 43 connected across the high voltage supply. Grounded resistor 42 is by-passed by capacitor 44, .01 $\mu$f. The anode of amplifier 37 is connected through section 10*c* of the talk-listen switch and load resistor 45, 3600 ohms, to the power supply.

The amplified signal from tube 37 is coupled through capacitor 46, 500 $\mu\mu$f., to detector circuit including crystal diode 47, 1N48, and a load including resistor 48, 270,000 ohms and two shunt filter capacitors 49 and 50, 500 $\mu\mu$f. each. The audio signal is developed across volume control resistor 55, 500,000 ohms, and is coupled through section 10*d* of the talk-listen switch and the series combination of resistor 56, 470,000 ohms, and capacitor 57, .005 $\mu\mu$f., to the control grid of audio amplifier 58, a 12AU6, which is returned to ground through resistor 59, 10 megohms, shunted by carrier by-pass capacitor 60, 500 $\mu\mu$f. The anode and screen grid of tube 58 are connected, respectively, through resistors 61, 470,000 ohms, and 62, 1.5 megohms, and a common load resistor 63, .5 megohm, to the power supply. The purpose of resistor 63 will become apparent later in the discussion of the "squelch" circuit.

The output of tube 58 is developed across resistor 61 and is coupled through capacitor 64, .005 $\mu$f., to the control grid of power amplifier 65, a 50C5. The control grid of amplifier 65 is returned to ground through resistor 66, 470,000 ohms, while the cathode thereof is connected to ground through bias resistor 67, 220 ohms, shunted by capacitor 68, 10 $\mu$f.; the control grid and cathode are connected together by a capacitor 69, 100 $\mu\mu$f. The anode of audio output amplifier 65 is coupled through primary winding 70*a* of audio output transformer 70 to a high B+ (approximately 100 volts) at the junction of resistors 20 and 22; the screen grid being connected directly to this junction. Secondary winding 70*b* of the output transformer is connected through section 10*e* of the talk-listen switch to loud speaker 71.

An automatic gain control voltage is developed across capacitor 75, .01 $\mu$f., which is connected through resistor 76, 1.5 megohms, to the negative terminal of the detector circuit. The control grid of radio frequency amplifier 37 is returned through section 10*f* of the talk-listen switch to the juncture between capacitor 75 and resistor 76; the other terminal of capacitor 75 being grounded through section 10g of the talk-listen switch. Capacitor 75 is shunted by resistor 77, 4.7 megohms.

Inasmuch as the unit when in operation is normally left in "listen" condition, a squelch circuit is provided for preventing noise appearing on the power line from being amplified and reproduced when no signal is being received. The basic elements of the squelch circuit is squelch tube 80, a 12AU6, connected for tetrode operation with the suppressor grid tied to the anode, which is in turn connected through resistor 63 to the power supply. The screen grid of squelch tube 80 is connected directly to the power supply and the cathode is returned to a variable positive voltage (0–4 volts) on a voltage divider made up of fixed resistor 81, 47,000 ohms and potentiometer 82, 2,000 ohms. The control grid of the squelch tube is connected to an integrating circuit made up of resistor 83, 1.5 megohms and capacitor 84, .01 $\mu$f., connected to the negative terminal of the detector. With the "talk-listen" switch in the "listen" position, and with no signal being received, the control grid of the squelch tube will have a voltage of zero or just slightly negative applied thereto. Tube 80 will conduct heavily since the screen grid has a high positive voltage (80 volts), although the high plate current flowing through resistor 63 will reduce the anode voltage substantially to zero.

Since both the screen grid and anode of audio amplifier 58 are connected to the anode of squelch tube 80, the audio amplifier itself will be cut off. Sensitivity control 82 may be adjusted so that this situation obtains regardless of the normal amount of noise in the noise encountered on the line. As soon as a signal is received by the station, the voltage applied to the control grid of the squelch tube will become increasingly negative, cutting this tube off and permitting the anode and screen grid voltage of audio amplifier 58 to rise to an operable value. Since the squelch tube operates on both the screen grid and anode of the amplifier, distortion of the incoming signal by partial cut off of the squelch tube is minimized. The squelch circuit is extremely sensitive, and when properly adjusted may be triggered by a rectified signal as small as 0.10 volt on the grid of the squelch tube. The long time constant of the integrator circuit (RC=.015 sec.) connected to the grid of squelch tube 80 delays the build-up of negative voltage on the grid of the squelch and prevents cut-off of the squelch tube by bursts of high amplitude noise energy.

Turning back now to the input circuit of radio frequency amplifier 37, it will be recalled that primary coil 29*a* of tuned antenna transformer 29 is connected in series with coil 30 across the power line. Multi-channel carrier wave intercommunication systems which utilize the power lines for communicating messages between units must necessarily utilize carrier waves of different frequencies if more than one conversation is to be carried on at a time. This in turn requires the use of tuned, frequency-sensitive circuits in the input of the amplifier unit. This in itself is not a difficult problem, but it often happens that, after the system has been installed, additional reactive loads may be connected to the power line in such a manner that they affect the tuned input circuit, to the point of detuning it far enough so that it has little or no response at the desired frequency. An example of such a load which might be connected to the line is a small A.C.-D.C. radio receiver which normally has an .05 $\mu$f. capacitor connected across the power supply input; a sufficient capacity to detune the input circuit of the intercommunication station system seriously. The radio frequency choke 30, which is connected in series with antenna transformer primary coil 29*a* across the line, comprises 80 turns of No. 28 wire and has an inductance of 38 $\mu$h. It has been found that with this additional inductive impedance in series with the amplifier input circuit the detuning effect of additional capacitive loads connected to the power line is negligible.

It is desirable that the selectivity and sensitivity characteristics of the tuned input circuits of the station be approximately the same for all channels. Since the system operates on frequencies from 98 to 250 kilocycles, it was found necessary to provide a special coupling network in order to achieve this condition. As mentioned briefly previously, the secondary winding 29*b* of the antenna coil is tuned by one of a set, 31, of capacitors as determined by the band selector switch, while coil 38*a* is tuned by the selected one of group 32 of capacitors. The terminals of the two tuned circuits common to the inductance and capacity of each are coupled through capacitor 35 while the other terminals of the tuning capacitors 31 and 32 are connected to a common point and returned through capacitor 36 and talk-listen switch section 10*g* to ground. Capacitor 35 together with the distributed capacity of the circuit components (a total of about 5.5 $\mu\mu$f.), provide adequate coupling of the signal at the higher frequencies while capacitor 36 insures adequate coupling on the low frequency bands, the circuits being slightly over-coupled on bands A and B to achieve the necessary band width.

When the talk-listen switch is pressed, moving it to "talk" position, the system is converted from a receiver to a transmitter, by changing the operation of some of the circuit elements. Amplifier tube 37 is utilized, in the talk position, as a modulated oscillator with a tuned grid circuit including coil 38*a*, compensating coil 85, compensating capacitor 86, variable up to 30 $\mu\mu$f., and the selected one of the tuning capacitors in group 32. Feedback is provided from the plate circuit to the grid circuit through coil 38*b* which is connected to the anode of the tube through section 10*c* of the talk-listen switch; the plate circuit of the oscillator being connected to the high B+ connection of the power supply. Self-bias of the oscillator is provided by a grid leak bias arrangement including resistor 88, 270,000 ohms, and capacitor 87, 100 μμf. The AGC system is shorted during transmission by section 10g of the talk-listen switch. The output of the modulated oscillator is inductively coupled from winding 38a of the oscillator coil to link winding 38c which is connected through section 10a of the talk-listen switch to the power line and returned to the common terminal through choke 30. Again, choke 30 minimizes the effect of reactive loads on the line, which during transmission would have the effect of detuning the oscillator. The oscillator coil windings are all of 7 strand, No. 40 Litz wire, winding 38a being 450 turns, 2.7 mh.; winding 38b, 144 turns, 2.0 mh. (slug tuned); and winding 38c, 80 turns 150 μh.

The modulation information is coupled from transducer 71 (the loud speaker is used also as a microphone) through section 10e of the talk-listen switch to an audio input transformer 90, the secondary of which is connected through section 10d of the talk-listen switch to the control grid of audio amplifier 58. (The continuous oscillation produced by tube 37 is rectified in detector 47 using a sufficient negative voltage on the grid of the squelch tube 80 to cut this tube off to permit operation of audio tube 58 during transmission.) The audio signal is coupled from audio amplifier 58 to modulator tube 65 where it is further amplified and coupled through capacitor 91, .05 μf., and section 10h of the talk-listen switch to the screen grid of oscillator 37. Section 10h of the talk-listen switch also connects resistor 92, 15,000 ohms, in parallel with resistor 42 of screen grid voltage divider during transmission. Thus, a relatively low voltage, of the order of 15 volts, is applied to the oscillator screen grid during transmission. This low voltage keeps the stage in oscillation but at a low amplitude except during the positive swing of the modulating signal. This circuit and its noise reducing operation are fully described in my aforementioned copending application and reference may be had thereto for further details thereof.

It will be recalled that the selected capacitors of group 32 are utilized both during reception and transmission to resonate with winding 38a, tuning the grid circuit of tube 37 to the same frequency. However, as the input impedance of tube 37 (which is in shunt with the tuned circuit) varies between the two conditions of the tube, the tuned circuit made up of winding 38a and the selected one of the capacitors 32, will not resonate at the same frequency during both reception and transmission. In order to correct this condition and to insure that the unit will operate at substantially the same frequency during both transmission and reception, on each band, a compensating circuit including compensating circuit including compensating coil 85 and compensating capacitor 86 are added to the circuit. As shown in the drawing, coil 85 is placed in series with winding 38a of the oscillator transformer while capacitor 86 is placed in parallel with the series combination thereof, through operation of section 10f of the talk-listen switch. In the embodiment which is discussed herein, compensating coil 85, 250 μh., has 150 turns of 7 strand No. 40 Litz wire and is slug tuned, while capacitor 86 is variable with a maximum capacity of 30 μμf.

In adjusting the tuned circuits, capacitors 31 and 32 are first adjusted to the proper frequencies with the unit operating as a receiver. At the same time the antenna and oscillator coils are properly adjusted on the lowest frequency band. The unit is then operated as a transmitter and compensating coil 85 is adjusted on band A to cause operation at the proper frequency; the compensating capacitor 86 is similarly adjusted on band F. The above steps or part of them may then be repeated one of more times to eliminate any detuning due to interaction between the various circuits.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a carrier intercommunication system which includes a plurality of stations and a power line interconnecting the stations and to which other loads may be connected, coupling means of the character described for connecting one of said stations to the line, comprising: a line coupling circuit for said station tuned to the carrier frequency; a choke having an impedance at carrier frequency, less than the impedance of said coupling circuit; and means for connecting said coupling circuit and said choke in series across said line, whereby the effect on said tuned circuit of capacitive loads added to said line is minimized.

2. In a carrier intercommunication system which includes a plurality of stations and a power line interconnecting the stations and to which other loads may be connected, coupling means of the character described for connecting a station to the line, comprising: an input circuit for said station tuned to the carrier frequency; a reactive impedance having a value less than the input impedance of said tuned input circuit; and means connecting said input circuit and said impedance across said line, whereby the effect on said tuned circuit of reactive loads opposite in character to said reactive impedance added to said line is minimized.

3. In a carrier intercommunication system which includes a plurality of stations and a power line interconnecting the stations and to which other loads of a reactive nature may be connected, coupling means of the character described for connecting one of said stations to the line, comprising: an input circuit for said station including a transformer having a winding and tuned to the carrier frequency; a radio frequency choke connected in series with said winding having an impedance at carrier frequency, less than the impedance of said tuned transformer; and means for connecting the series combination of said winding and choke across said power line, whereby the effect on said tuned circuit of capacitive loads added to said line is minimized.

4. In a carrier intercommunication system which includes a plurality of stations and a power line interconnecting the stations and to which other loads of reactive nature may be connected, coupling means of the character described for connecting a station to the line, comprising: an input circuit for said station including a transformer having a winding and tuned to the carrier frequency; a radio frequency choke connected in series to said winding, said choke having an inductance substantially less than the inductance of said winding; and means for connecting the series combination of said winding and choke across said power line, whereby the effect on said tuned circuit of capacitive loads added to said line is minimized.

5. In a carrier intercommunication system which includes a plurality of stations and a power line interconnecting the stations and to which other loads of a reactive nature may be connected, coupling means of the character described for connecting one of said stations to the line, comprising: an input circuit for said station including a transformer having a primary winding and a secondary winding tuned to the carrier frequency; a radio frequency choke connected in series with said primary winding having an impedance at carrier frequency, less than the impedance of said input circuit; and means for connecting the series combination of said primary winding and choke across said power line whereby the effect on said tuned circuit of capacitive loads added to said line is minimized.

6. In a carrier intercommunication system which includes a plurality of stations and a power line interconnecting the stations and to which other loads of a reactive nature may be connected, coupling means of the character described for connecting a station to the line, comprising: an input circuit for said station including a transformer having a primary winding and a secondary winding tuned to the carrier frequency; a radio frequency choke connected in series with said primary winding and having an inductance of the order of one-quarter of the inductance of the primary winding of said transformer and an impedance substantially less than the input impedance of said input circuit; and means for connecting the series combination of said primary winding and choke across said power line whereby the effect on said tuned circuit of capactive loads added to said line is minimized.

References Cited in the file of this patent

UNITED STATES PATENTS

| | | |
|---|---|---|
| 980,358 | Squier | Jan. 3, 1911 |
| 1,862,137 | Curtis | June 7, 1932 |
| 2,143,563 | Levy et al. | Jan. 10, 1939 |
| 2,632,812 | Cooney | Mar. 24, 1953 |
| 2,837,599 | Marks | June 3, 1958 |